(12) United States Patent
Lundgren

(10) Patent No.: US 9,421,918 B2
(45) Date of Patent: Aug. 23, 2016

(54) LOAD CARRIER FOOT AND A LOAD CARRYING ROOF RACK FOR A VEHICLE COMPRISING A LOAD CARRIER FOOT

(75) Inventor: Anders Lundgren, Grimsas (SE)

(73) Assignee: Thule Sweden AB, Hillerstorp (SE)

( * ) Notice: Subject to any disclaimer, the term of this patent is extended or adjusted under 35 U.S.C. 154(b) by 136 days.

(21) Appl. No.: 14/349,649

(22) PCT Filed: Aug. 1, 2012

(86) PCT No.: PCT/EP2012/065015
§ 371 (c)(1),
(2), (4) Date: Apr. 8, 2014

(87) PCT Pub. No.: WO2013/037558
PCT Pub. Date: Mar. 21, 2013

(65) Prior Publication Data
US 2014/0224850 A1    Aug. 14, 2014

(30) Foreign Application Priority Data
Sep. 16, 2011 (EP) .................................. 11181665

(51) Int. Cl.
*B60R 9/058* (2006.01)
*B60R 9/052* (2006.01)

(52) U.S. Cl.
CPC ............... *B60R 9/058* (2013.01); *B60R 9/052* (2013.01)

(58) Field of Classification Search
CPC ......... B60R 9/045; B60R 9/052; B60R 9/04; B60R 9/058
USPC ................................................ 224/322, 319
See application file for complete search history.

(56) References Cited
U.S. PATENT DOCUMENTS
5,806,735 A * 9/1998 Christiansson ......... B60R 9/045 224/319

FOREIGN PATENT DOCUMENTS

| AU | 2003231667 | 2/2004 |
|---|---|---|
| DE | 2227459 | 12/1973 |
| FR | 2723046 | 2/1996 |
| WO | 2004024506 A1 | 3/2004 |
| WO | 2008140379 | 11/2008 |
| WO | 2013037558 A1 | 3/2013 |

OTHER PUBLICATIONS

International Search Report mailed Oct. 30, 2012; in corresponding PCT patent application No. PCT/EP2012/065015.
International Preliminary Report mailed Mar. 18, 2014; in corresponding PCT patent application PCT/EP2012/065015.
English abstract for DE2227459; published on Dec. 20, 1973 and retrieved on Apr. 3, 2014.
English abstract for FR2723046; published on Feb. 2, 1996 and retrieved on Apr. 3, 2014.
Written Opinion of The International Searching Authority mailed Nov. 6, 2012; in corresponding PCT patent application No. PCT/EP2012/065015.

* cited by examiner

*Primary Examiner* — Adam Waggenspack
(74) *Attorney, Agent, or Firm* — Sterne, Kessler, Goldstein & Fox, P.L.L.C.

(57) ABSTRACT

A load carrier foot, and a load carrying roof rack for a vehicle having at least one such load carrier foot. The load carrier foot has a lock arrangement for locking a load carrying bar to the load carrier foot comprising a wedge member, a tensioning member. The wedge member is adapted to cooperate with the tensioning member so that upon operation of the tensioning member. A clamping member is further arranged in working cooperation with the tensioning member. The present invention provides for a load carrying foot having a lock arrangement which requires little space inside of the load carrying bar to lock the load carrying bar to the load carrying foot, it permits the load carrier foot to be attached to the load carrying bar in a plurality of positions and it enables the load carrying bar to be attached to the load carrying foot while at the same time attach to the vehicle using the same tensioning member.

21 Claims, 14 Drawing Sheets

LOAD CARRIER FOOT AND A LOAD CARRYING ROOF RACK FOR A VEHICLE COMPRISING A LOAD CARRIER FOOT

CROSS-REFERENCE TO RELATED APPLICATION

This application is a national phase application of International Application Number PCT/EP2012/065015, which has an international filing date of Aug. 1, 2012, and claims priority to European Application No. 11181665.8, filed on Sep. 16, 2011, and which applications are entirely incorporated by reference herein.

TECHNICAL FIELD

The present invention relates to a load carrying foot for a vehicle. The load carrying roof rack has a load carrying bar adapted to extend across the surface of the roof of the vehicle during use. The present invention also relates to a load carrying roof rack having at least one load carrying foot. The load carrying foot comprises a lock arrangement to attach, or fix, the load carrying bar in at least one position using a wedge member and at least one displaceable locking member.

BACKGROUND

Vehicle roof racks, also known as load carrier roof racks, have recently been subjected to special attention. While safety and easy handling are still key words, wind resistance and air turbulence have started to be more and more important. Load carrying bars, or transverse cross bar provides for wind turbulence when a vehicle is moving. As a vehicle moves and as the wind passes the load carrying bar turbulent flow of air is produced; this is especially the case when a load carrier roof rack carries no load. The turbulent flow of air produces noise and increases the overall wind resistance of the vehicle, and thereby the fuel consumption.

The patent publication of DE 10012905 (A1) discloses a roof rack with a transverse member, or cross member, having a streamlined profile (droplet-shaped or oval) to reduce air resistance and to create a downward-directed aerodynamic force. Turbulence barriers or flow breakaway edges are fitted to the top and bottom of the cross member to reduce wind noise.

SUMMARY

There are some drawbacks to the known prior art. The connection between the load carrier feet and the load carrier bar is not very sophisticated. Generally they tend to be space consuming, thus requiring a compromise between the ability provide for a low wind resistance and the ability to safely secure the load carrier foot the load carrier bar. It is an object of the present invention to at least partly solve this drawback, or to at least provide for a useful alternative. More specifically is the object met by a load carrier foot for a load carrying roof rack for a vehicle. The load carrying foot is adapted to be connected with a load carrying bar having a longitudinal extension, a height and a width.

A lock arrangement for attaching the load carrying bar to the load carrying foot, comprising a tensioning member operable to displace a wedge member along the longitudinal extension of the load carrying bar to a retaining position in which the wedge member retains the load carrying bar to the load carrying foot in a locked position. A retaining arrangement to retain the load carrier foot to the vehicle. The tensioning member is further arranged to operate the retaining arrangement.

The present invention provides for a load carrier foot having a locking arrangement which consumes little space inside of the load carrier bar, and especially in the height and/or the width direction of the load carrying bar, while at the same time it provides for a good attachment capabilities to the vehicle which can be tightened simultaneously using the tensioning member, i.e. only one operation is required to both fix, i.e. lock, the load carrying bar to the load carrying foot and to fix, i.e. lock, the load carrier foot to the vehicle.

An advantage is that the lock arrangement can be substantially inserted into the load carrying bar, this enables the position of the load carrying bar to be adjusted with respect to a first and a second load carrier foot. The load carrying roof rack can thus be adjusted to fit different vehicles of different sizes. Optionally, it can enable the load carrying roof rack to be a flush bar load carrying roof rack.

The retaining arrangement can comprise a clamping member adapted to impart a clamping force between the first surface of the vehicle and the clamping member upon operating the tensioning member, to thereby retain the load carrier foot to the vehicle.

According to an aspect, the wedge member can be arranged in working cooperation with at least one intermediate member, such as a displaceable locking member of the load carrying foot, to wedge the intermediate member to abut an inner surface of the load carrying bar, to thereby retain the load carrying bar to the load carrying foot in a locked position.

The intermediate member or at least one displaceable locking member can be at least partly displaced along a direction corresponding to the width and/or height of the load carrying bar when the load carrying bar is mounted on the vehicle.

According to an aspect, upon the displacement of the wedge member, the wedge member abut at least one surface arranged on the inner surface of the load carrying bar, to retain the load carrying bar to the load carrying foot in a locked position. The wedge member and the load carrying foot can thus be adapted to wedge against at least one interior surface of the load carrying bar and/or against at least one surface of the load carrying bar. It has been found advantageous that the wedge member abut against a surface of the load carrying foot and against an inner surface of the load carrying bar to lock the load carrying bar to the load carrying foot.

According to an aspect, the displaceable locking member comprises a first portion and a second portion. The first portion is adapted to be displaced a greater distance than the second portion, and the wedge member is adapted to be displaced in a direction from the first portion to the second portion of the displaceable locking member during the displacement to the locked position. This enables the locking members to extend from the body of the load carrier foot and thus to extend through an opening at the end of the load carrier bar. No slit or extra opening is required in the load carrying bar to lock the load carrier bar to the load carrier foot. The load carrying bar does not need to extend past the load carrier foot in a protruding manner, which is generally referred to as a "flush" load carrier foot.

According to an aspect, the wedge member, when being in the retaining position, imparts a force component along the height of the load carrying bar and/or along the width of the load carrying bar, so that the wedge member retains the load carrying bar to the load carrying foot in a locked position. Dependent on how the wedge member is formed and how the interior surface of the load carrying bar, or if an intermediate member is used, how the intermediate member is formed, the wedge function can be made to operate between the upper and lower inner surfaces of the load carrying bar, and/or, the front and rear inner surface of the load carrying bar. This provides for a flexible solution which can be adapted to fit a wide variety of different vehicles of different sizes.

According to an aspect, the load carrier foot further comprises a sledge. The clamping member is operable via the sledge and in working cooperation with the sledge via the tensioning member so that upon operation of the tensioning member, the sledge and the wedge member are displaced with respect to each other. It should be noted that in practise it is a relative movement between the sledge and the wedge member. While the sledge is displaced a distance enough for the clamping member to build up a sufficient clamping force, the wedge member is only required to be pinned, i.e. wedged, between two surfaces, to provide for the counter force required to tighten the clamping member. According to an aspect, at least a part of the clamping member is adapted to be detachably connectable to the sledge. The load carrier foot can be easily mounted to a vehicle by having a releasable clamping member. It is however within the boundaries of the invention that the sledge is releasably connectable to the tensioning member instead. The clamping member can thus be attached to the load carrier foot at a first position, and to the sledge, or the clamping member is releasably attached to the load carrier foot at a first position and/or to the sledge.

The sledge can comprise an aperture, or slot, through which the tensioning member extends. Optionally the sledge is slideably arranged to the load carrier foot, the sledge could however be displaceable by other means. According to an aspect, the load carrier foot comprises at least one slip surface, and the sledge slips on the at least one slip surface of the load carrier foot when operating the tensioning member.

The sledge can advantageously slide in a portion of the load carrier foot having substantially a C-shaped cross section for example.

According to an aspect, the tensioning member is a rotatable tensioning member, such as a screw. As long as the longitudinal displacement of the sledge is providing the appropriate clamping force required, it is however possible to have a tensioning member which is operated by pressing or pulling the tensioning member.

According to an aspect, the wedge member is threadably engaged with the tensioning member, enabling displacement of the wedge member upon rotation of the tensioning member along the longitudinal extension of the load carrying bar. The wedge member thus comprises a threaded aperture which cooperates with a threaded section of the tensioning member. Using threaded connections permits an appropriate level of torque to translate to the wedge member via the tensioning member.

According to an aspect, the load carrier foot comprises a body having a cavity, the cavity being adapted to receive at least a part of the load carrying bar. The cavity of the body can cooperate with the load carrying foot, e.g. at least one displaceable locking member to retain the load carrying bar to the load carrying foot in a locked position.

According to an aspect, the lock arrangement comprises a first and a second displaceable locking member, and the first and the second displaceable locking members are formed by one unitary piece of material. They can also be formed integrally with the body of the load carrier foot or be formed by separate pieces attached thereto. By forming the first and the second displaceable locking member integrally with the body of the load carrier foot, the load carrier foot can be form molded in an easy manner. According to an aspect, the lock arrangement comprises a first and a second displaceable locking member, and the first and the second displaceable locking members are formed by separate elements.

According to an aspect, the wedge member extends substantially between the first and second displaceable locking members.

According to an aspect, the at least one displaceable locking member comprises at least one slip surface. The sledge and the wedge member slips on the at least one slip surface of the at least one displaceable locking member during the displacement, i.e. when the tensioning member is operated.

According to an aspect, the slip surface of the displaceable locking member(s) is formed by a groove. The groove is arranged on the displaceable locking member and generally serves the purpose of guiding the wedge member to prevent the wedge member form being misaligned or from being pinched.

According to an aspect the clamping member is formed by a strap element, or by a rigid bracket member. A part of the strap element or the rigid bracket can be detachably connected to the sledge.

According to an aspect, the tensioning member is a rotatable tensioning member, such as a screw.

According to an aspect, the load carrier foot comprises a body, and wherein the at least one displaceable locking member is formed integrally with the body. In an embodiment, at least two displaceable locking members are formed integrally with the body. This provides a load carrier foot with very few parts, reduces the amount of time required to assemble the load carrier foot.

According to an aspect, the displaceable locking member is a deformable locking member. The deformable locking member can deform to thereafter return to its original form after deformation.

According to an aspect, the deformable locking member comprises a first portion and a second portion, the first portion is adapted to deform to a greater extent than the second portion. The wedge member is further adapted to be displaced in a direction from the first portion to the second portion of the deformable locking member during the deformation to the locked position.

According to an aspect, the present invention also relates to a load carrying roof rack for a vehicle comprising a first and a second load carrier foot according to claim 1, or in any one of the preceding claims, or as described in any of the embodiments herein, and a load carrying bar.

According to an aspect, the at least one of the first and second load carrier foot is adapted to retain the load carrying bar at a plurality of different positions with respect to the load carrier foot, thereby enabling the distance between the first and the second load carrying foot to be adjusted to fit a variety of vehicle of different sizes.

According to an aspect, the load carrying roof rack comprises means for biasing the load carrying bar towards a steady state position with respect to the first and second load carrying foot.

According to an aspect, the load carrying bar comprises a front inner surface and a rear inner surface, and the at least one displaceable locking member is adapted to be displaced against at least one of the front inner surface or the rear inner surface of the load carrying bar.

According to an aspect, the load carrying bar comprises an upper inner surface and a lower inner surface, and the wedge member is adapted to impart a force component towards the upper inner surface and the lower inner surface of the load carrying bar.

According to an aspect, the lock arrangement comprises a first and a second displaceable locking member. The first displaceable locking member is adapted to be displaced against the rear inner surface, and in that the second displaceable locking member is adapted to be displaced against the front inner surface of the load carrying bar.

BRIEF DESCRIPTION OF FIGURES

Embodiments of the present invention will be described in greater detail and with reference to the accompanying figures in which;

FIG. 1 shows a schematic figure of parts of a vehicle having a load carrying roof rack attached comprising a first and a second load carrier foot according to an embodiment of the present invention and a load carrying bar extending there between;

DETAILED DESCRIPTION

Figure 1:
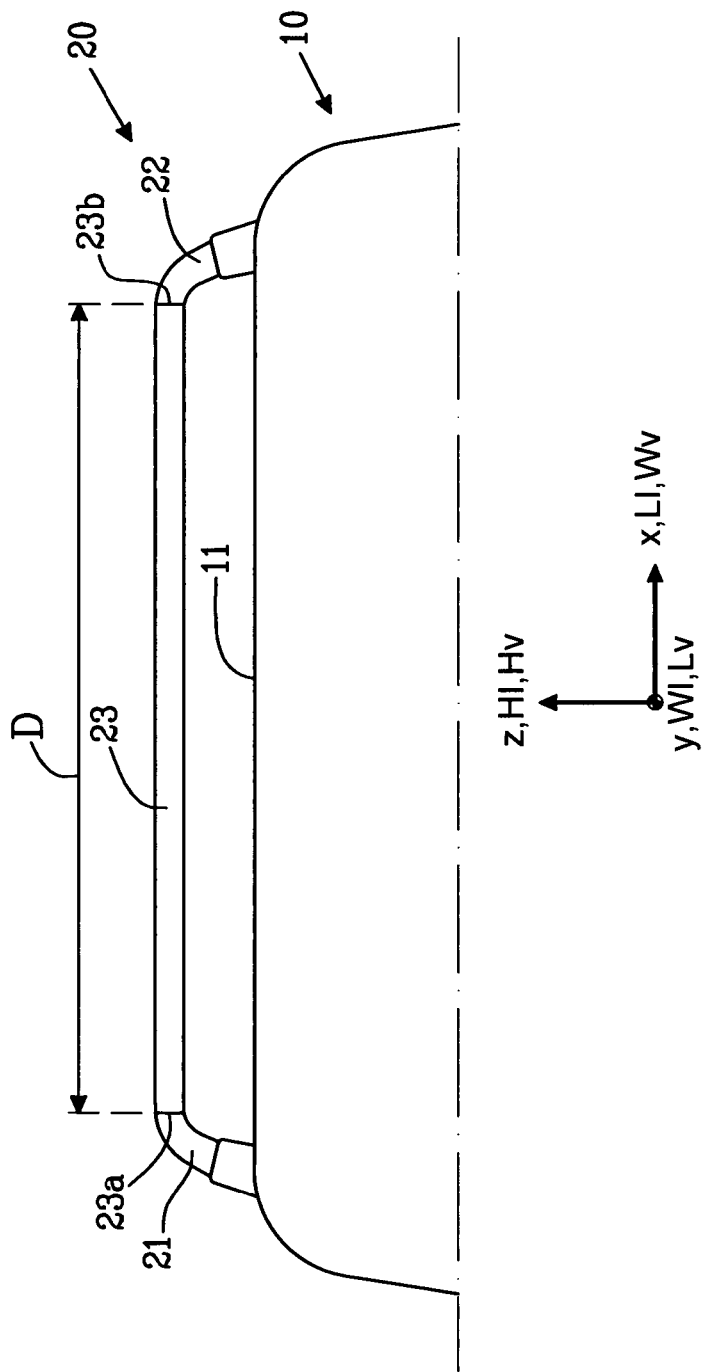

The present invention will be described in greater detail with reference to the following embodiment(s). FIG. 1 shows parts of a vehicle 10 having a roof 11. A load carrying roof rack 20 with a first and a second load carrier foot 21, 22 is arranged to the roof 11. A load carrying bar 23 extends between the first and the second load carrier foot 21, 22. In the embodiment shown in FIG. 1, the distance, indicated by the reference D in FIG. 1, between the first and the second load carrier foot 21, 22 can be changed to adjust the load carrying roof rack 20 to vehicles of different sizes. The present invention can be applied to different types of load carrying roof racks, but it is advantageous to be applied to flush load carrying roof racks. A flush load carrying roof rack is generally defined by that the ends of the crossbar do not extend beyond the legs of the roof; instead each end of the crossbar is flush with the respective leg of the roof rack supporting the load carrying bar at that end. Such roof racks are referred to in this specification as "flush bar" roof racks, or flush load carrying roof racks. The length of the load carrying bar of a flush load carrying roof rack is less than the width of the vehicle to which the roof rack is to be attached.

For the purpose of orientation, the load carrying bar 23 has a length L1 which extends across the roof 11 of the vehicle 10, a height H1 and a width W1. The width W1 of the load carrying bar 23 extends in the longitudinal direction of the vehicle 10. A Z axis corresponds to the height Hy of the vehicle 10 and the height H1 of the load carrying bar 23; a X axis corresponds to the width Wv of the vehicle 10 and the length L1 of the load carrying bar 23; a Y axis corresponds to the length Lv of the vehicle 10 and the width W1 of the load carrying bar 23.

Figure 2:
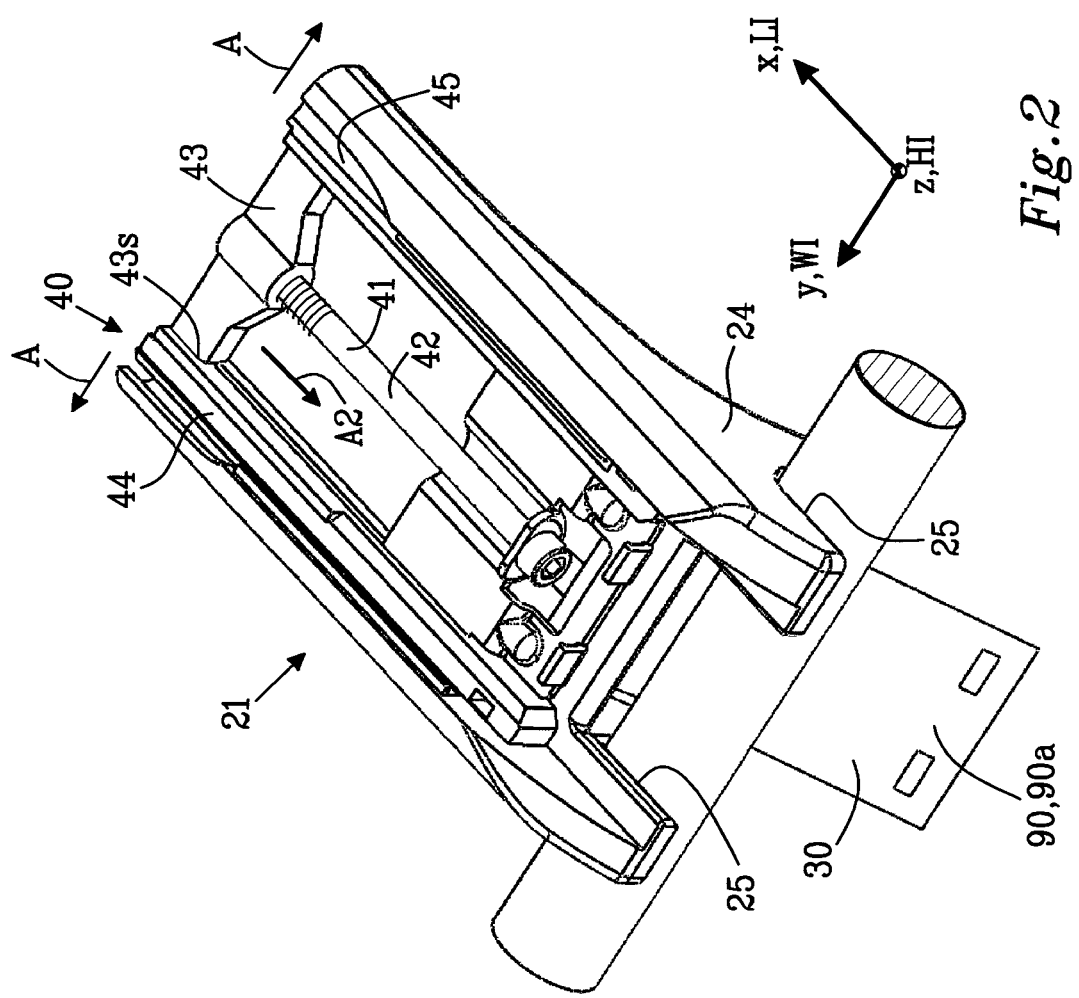
FIG. 2 show a load carrier foot according to an embodiment of the present invention without the load carrying bar and with the mechanism exposed, and parts of a rail of a vehicle.

FIG. 2 shows the first load carrying foot 21 in greater detail; hereafter only referred to as the load carrying foot 21. The load carrying foot 21 comprises a body 24 having a support surface 25 adapted to abut against a first surface of the vehicle 10. The first surface of the vehicle 10 can be a surface of the roof 11 of the vehicle 10 or optionally a surface as shown in FIG. 2, such as a rail, flush rail or similar. The support surface 25 is adapted to cooperate with a retaining arrangement 30, to retain and secure the load carrying foot 21 to the vehicle 10. The retaining arrangement 30 can be of different types such as clamping type e.g. strapping around type or bracket type, fix point type, or any other retaining mechanism. Herein, a retaining arrangement of a strapping around type, or strap type, is described.

The load carrying bar 23 of the load carrier foot 21 is adapted to be locked to the load carrier foot 21 at a plurality of different positions using a lock arrangement 40, thus enabling the distance D between the first and the second load carrier foot 21, 22 to be changed. The lock arrangement 40 can however also be used to lock the load carrier bar 23 at a single position only if desired.

The lock arrangement 40 comprises a tensioning member 41 by which the lock arrangement 40 can be operated. In the embodiment shown in FIG. 2, the tensioning member is a rotatable member, in this case a screw 42.

The tensioning member 41 is in working cooperation with a wedge member 43. When the tensioning member 41 is operated, the wedge member 43 is displaced between at least a first and a second position. In cases of a screw 42; when the screw 42 is rotated, the wedge member 43 is displaced between the first and the second positions as will be described in greater detail below.

The tensioning member 41, i.e. the screw 42, is positioned so that after assembly with the load carrying bar 23, the screw 42 is arranged in the longitudinal direction of the load carrying bar 23, i.e. along the X axis and the length L1 of the load carrying bar 23. This enables the screw 42 upon rotation to displace the wedge member 43 in a direction along the length L1 of the load carrying bar 23.

The wedge member 43 is further arranged in working cooperation with at least one displaceable locking member 44, which forms an intermediate member to the inner surface of the load carrying bar 23. The displaceable locking member 44 is adapted to cooperate with a surface of the load carrying bar 23, and more specifically with an inner surface of the load carrying bar 23. When the locking member 44 properly engages the surface of the load carrying bar 23, the load carrying bar 23 is secured to the load carrier foot 23 and prevented from being displaced. The means of engagement between the displaceable locking member 44 and the surface of the load carrying bar 23 can be friction. It is also possible that the locking member 44 cooperates with a flange or a corrugated surface to improve the friction and the locking capabilities of the displaceable locking member 44.

The wedge member 43 comprises at least one slip surface 43s, which is adapted to slip on the cooperating displaceable locking member 44 upon displacement of the wedge member 43. In the shown embodiment the slip surface 43s is positioned directly adjacent the displaceable locking member 44, it is however possible that an intermediate material layer or intermediate member is present. The wedge member 43 has a substantially elongated flat form. The elongated extension of the wedge member 43 extends along the Y axis, i.e. the width Wl of the load carrying bar 23 after assembly. The flat form of the wedge member 43 is advantageous due to the restricted height Hl of the load carrying bar 23. In the shown embodiment of FIGS. 2-9, the wedge member 43 comprises two slip surfaces 43s arranged at a first and a second end of the wedge member 43. Substantially at the centre of the wedge member 43 and between the two slip surfaces 43s, is a threaded aperture in which the tensioning member 41, in this case the screw 42, is threaded.

It is however possible, as will be described further below, that the slip surfaces of the wedge member 43 are arranged on other parts or sections on the wedge member 43.

The at least one displaceable locking member is at least partly displaced along a direction corresponding to the width Wl of the load carrying bar 23 as indicated by the arrows A in FIG. 2. This enables the load carrying bar 23 to be manufactured with a very small height Hl, which in turn reduces the wind resistance when driving the vehicle 10.

The load carrier foot 21 can be arranged with at least one displaceable locking member, optionally at least two displaceable locking members. In the embodiment shown FIG. 2-9, the wedge member 43 extends between a first and a second displaceable locking member 44, 45. When the wedge member 43 is displaced, both the displaceable locking members 44, 45 are displaced to respectively abut an inner surface of the load carrying bar 23.

Figure 3:
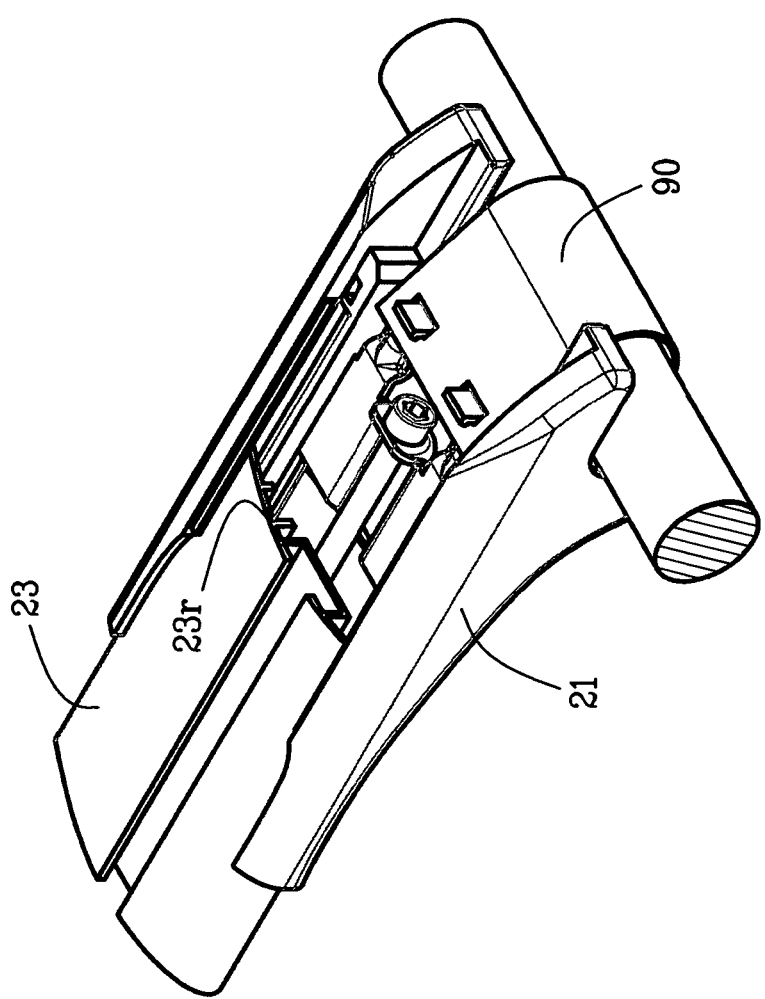
FIG. 3 show the load carrier foot from FIG. 2 with the load carrying bar and with the mechanism exposed, and parts of a rail of a vehicle.

FIG. 3 shows the load carrier foot 21 after assembly with the load carrying bar 23. For the sake of clarity, parts of the mechanisms are shown. The load carrying bar 23 can be manufactured from extruded aluminum or other suitable material. Using a load carrier foot, according to the present invention, the load carrying bar does not need specific openings or cavities or the like to be attached to the load carrier foot. Instead, the load carrying bar 23, can be manufactured simply by cutting off a load carrying bar from a master piece, e.g. during extrusion or afterwards when an extruded piece is cut into appropriate lengths. This simplifies and reduces the costs of the production of the load carrying bars.

Figure 4:
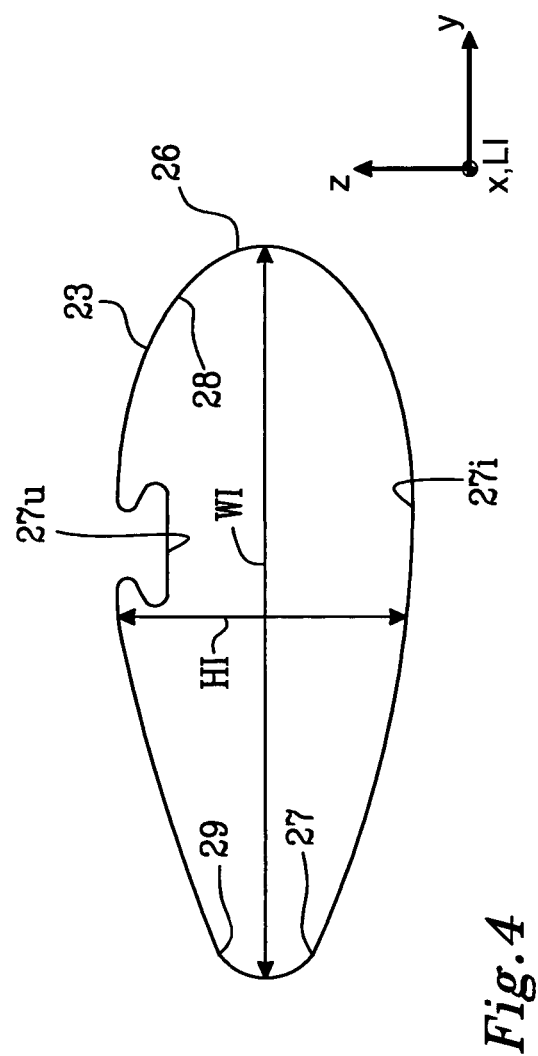
FIG. 4 shows a cross section of the load carrying bar from FIG. 3.

The load carrying bar 23 can have a variety of different cross sections. FIG. 4 shows a cross section of the load carrying bar 23. As is noticed, the cross section is drop formed to provide for a wing like profile to the load carrying bar 23 to reduce the wind resistance. The load carrying bar 23 has an outer surface 26, and an inner surface 27. The height Hl and the width Wl of the load carrying bar 23 is illustrated with arrows. The inner surface 27 of the load carrying bar 23 has a front inner surface 28 and a rear inner surface 29, the inner surface further has an upper inner surface 27u, and a lower inner surface 27l, the lower inner surface is intended to be closer to the vehicle roof than the upper inner surface 27c after being mounted as intended to a vehicle. The front inner surface 28 is intended to be positioned towards the main direction of travel and thus towards the front of the vehicle 10 during use, i.e. after load carrying roof rack 20 has been assembled with the vehicle 10. The rear inner surface 29 is intended to be positioned towards the rear of the vehicle 10 during use, i.e. after load carrying roof rack 10 has been assembled with the vehicle 10.

Figure 5:
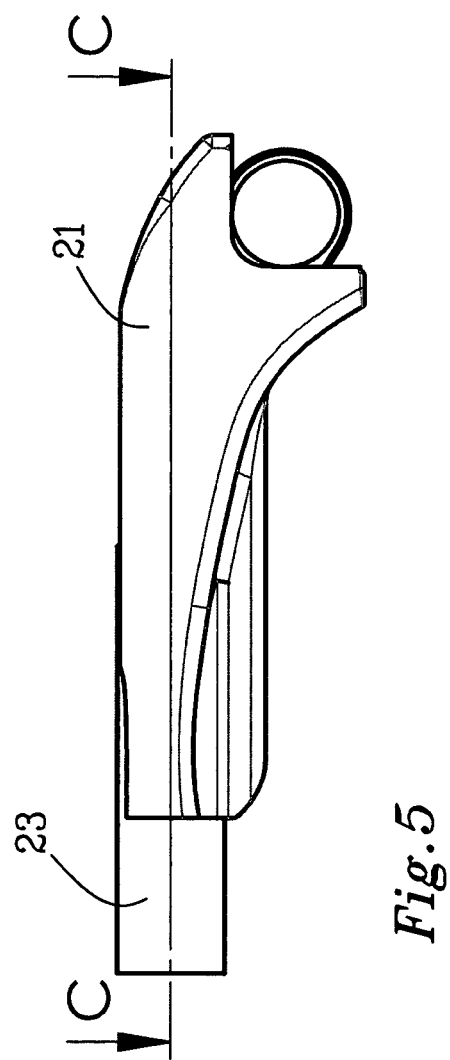
FIG. 5 show the load carrier foot from FIGS. 2 and 3 as seen from the side.
Figure 6:
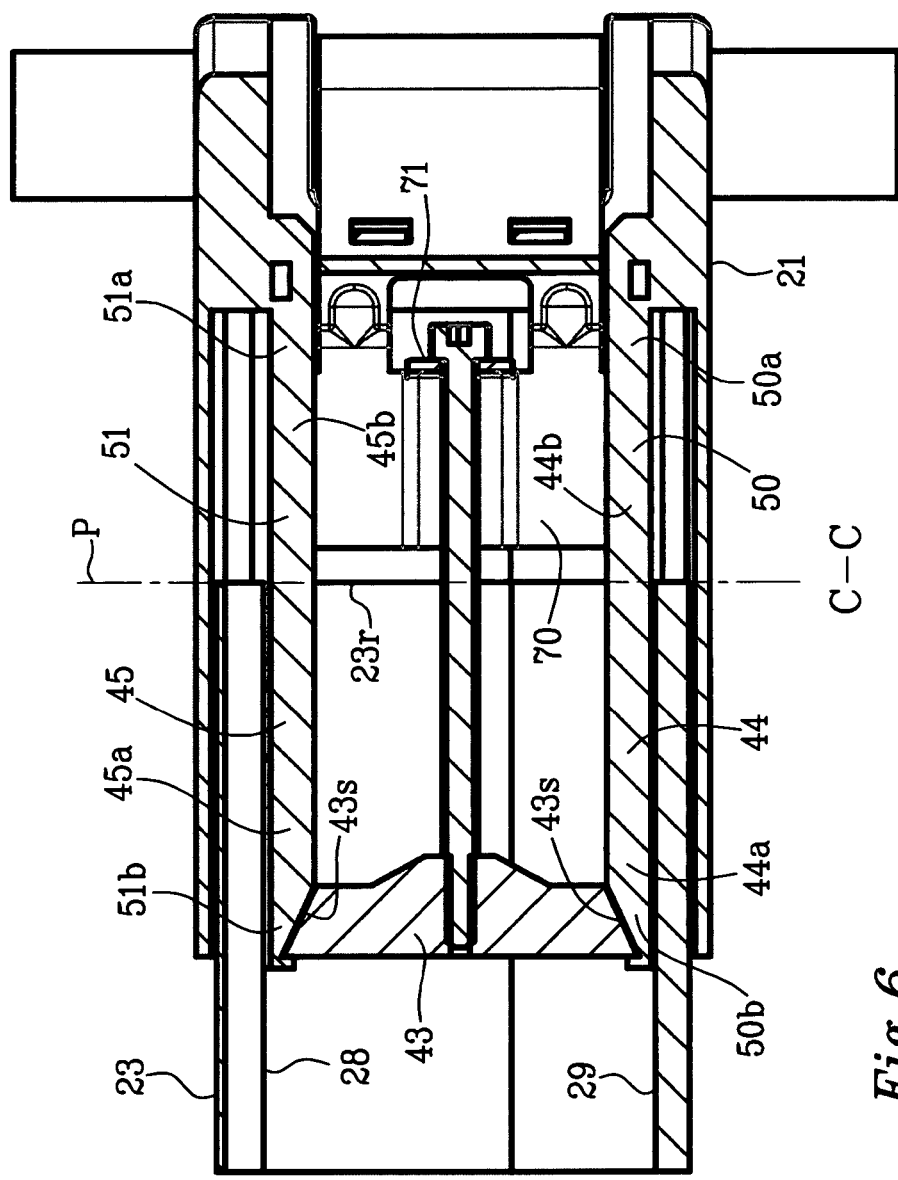
FIG. 6 show a cross section along C-C from FIG. 5.
Figure 7:
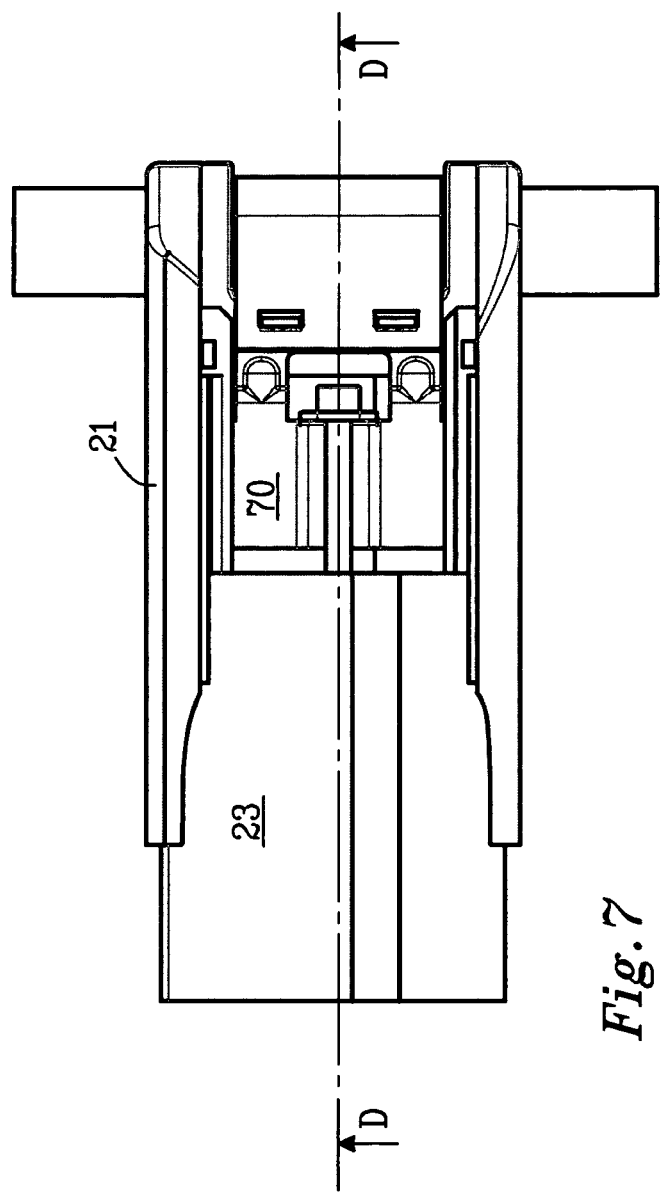
FIG. 7 show the load carrier foot from FIGS. 2 and 3 as seen from above.
Figure 8:
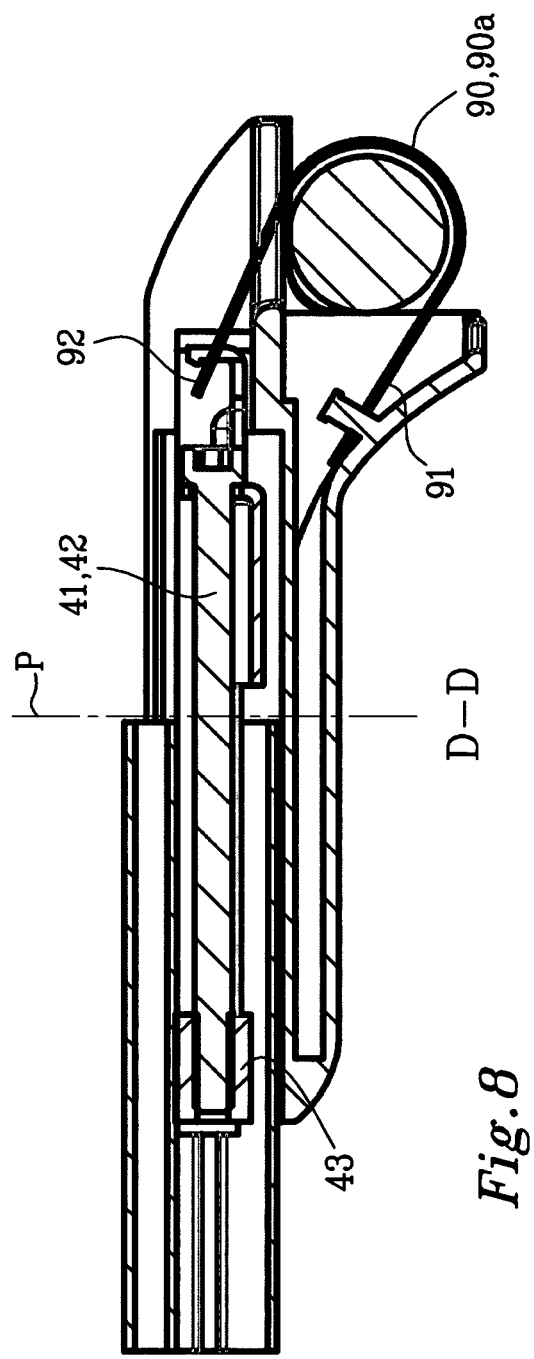
FIG. 8 show a cross section along D-D from FIG. 7.

FIG. 5 shows the load carrier foot 21 from the side and the FIG. 6 shows a cross section of the load carrier foot 21 along a section C-C. The load carrying bar 23 has a first and a second end 23a, 23b, as shown in FIG. 1, which each has a rim 23r (of which only one is shown in FIG. 6). The rim 23r of the first end 23a of the load carrying bar 23 is shown in FIGS. 5-8 and as there is no slits or cut outs at the first end 23a, the rim 23r defines a single plane P, indicated by the dashed lines in FIGS. 6 and 8. The lock arrangement 40 extends through the single plane P and thus intersects with the single plane P, independently of the position of the load carrying bar 23. The lock arrangement 40 thus extends into the interior void of the load carrying bar 23 from the first end 23a of the load carrying bar 23 as is seen in FIGS. 6-8.

Turning to FIG. 6, when the wedge member 43 is displaced, both the displaceable locking members 44, 45 are displaced to respectively abut an inner surface of the load carrying bar 23, in this case the front inner surface 28 and the rear inner surface 29. It should be noted however that the cross section of the load carrying bar 23 could be partitioned by one or more inner walls, e.g. to provide for rigidity to the load carrying bar 23. In such cases, it is possible that at least one of the displaceable locking members 44, 45 abuts a partition wall of the load carrying bar 23, which is also considered to be an inner wall of the load carrying bar 23.

The first and the second displaceable locking members 44, 45 can be a first and a second deformable locking member 44, 45 as shown in FIGS. 2-9. The term deformable is to be interpreted as elastically deformable. The deformable locking members 44, 45 are adapted to be deformed when the wedge member 43 is displaced, so as to abut the front and rear inner surfaces 28, 29 of the load carrying bar 23. Each of the deformable locking members 44, 45 is formed by an elongated body 50, 51 having a first and a second end 50a, 50b, 51a, 51b. The first ends 50a, 51a of the first and the second deformable locking members 44, 45 are integrated with the body 24 of the load carrier foot 21. As the wedge member 43 is displaced towards the first end 23a of the load carrying bar 23, the second ends 50b, 51b are displaced to abut the inner surface 27 of the load carrying bar 23, while the first ends 50a, 51a are not displaced to any significant degree. Should the wedge member 43 be displaced in the opposite direction, i.e. towards the second end 23b of the load carrying bar 23, using the tensioning member 41, the first and the second deformable locking members 44, 45 would disengage the front and rear inner surfaces 28, 29 of the load carrying bar 23 and return to their original position. The deformation of the first and second deformable locking members 44, 45 are thus dependent upon the elasticity of the material from which the first and the second deformable locking members 44, 45 are manufactured from. A suitable material could be one or more thermoplastic materials, carbon fiber reinforced material such as reinforced thermoplastic material, fiberglass or the like. Metals are also possible, such as spring steel, alumina or the like.

As is shown in FIG. 6, the wedge member 43 substantially extends between the first and the second deformable locking members 44, 45 and slips on a first and a second slip surface 60, 61, arranged on the first and the second deformable locking members 44, 45 respectively, during displacement. The wedge member 43 thus extends between the first and the second slip surfaces 60, 61, arranged on the first and the second deformable locking members 44, 45.

The deformable locking members 44, 45 each comprise a first portion and a second portion 44a, 44b, 45a, 45b. The first portion 44a, 45a is being adapted to be displaced, or deformed, a greater distance than the second portion 44b, 45b of the deformable locking members 44, 45. The wedge member 43 is adapted to be displaced in a direction from the first portion 44b, 45b to the second portion 44a, 45a of the deformable locking members 44, 45 during the deformation towards a locked position, and in the opposite direction towards an unlocked position. When reaching the locked position, the wedge member 43 is physically restricted from further movement by the first and the second deformable locking members 44, 45 and their interaction with the front and the rear inner surfaces 28, 29 of the load carrying bar 23.

The first and the second deformable locking members 44, 45 can be manufactured in a unitary piece of material with each other and with the body 24 of the load carrier foot 21, or, they can be attached as separate pieces of material to the body 24 of the load carrier foot 21.

The tensioning member 41 is in the shown embodiment in FIGS. 2-9 cooperating with a sledge 70. The sledge 70 is displaceably arranged with respect to the first and the second deformable members 44, 45 and with respect to the wedge member 43. As is noticed, the sledge 70 is arranged to slip on the slip surfaces 60, 61 which extend along the first and the second deformable locking members 44, 45, and thus interact with the wedge member 43 during operation of the tensioning member 41. The sledge 70 and the wedge member 43 are aligned in the same plane P2 (shown in FIG. 9 in greater detail), in this embodiment, the plane P2 is defined by the first and the second grooves 62, 63 of the first and the second deformable locking members 44, 45 and which extends substantially parallel with the length L1 of the load carrying bar 23 after assembly therewith.

The tensioning member 41 extends between the wedge member 43 and the sledge 70 and is adapted to be in working cooperation with the wedge member 43 and the sledge 70. In the shown embodiment, the tensioning member 41 is in the form of a screw 42 having threads. The screw 42 is threadably engaged with the wedge member 43 while being connected with the sledge 70 with a swivel connection, in this case inserted through an aperture 71 on the sledge 70, providing a swivel connection together with a head of the screw 42.

Figure 9:
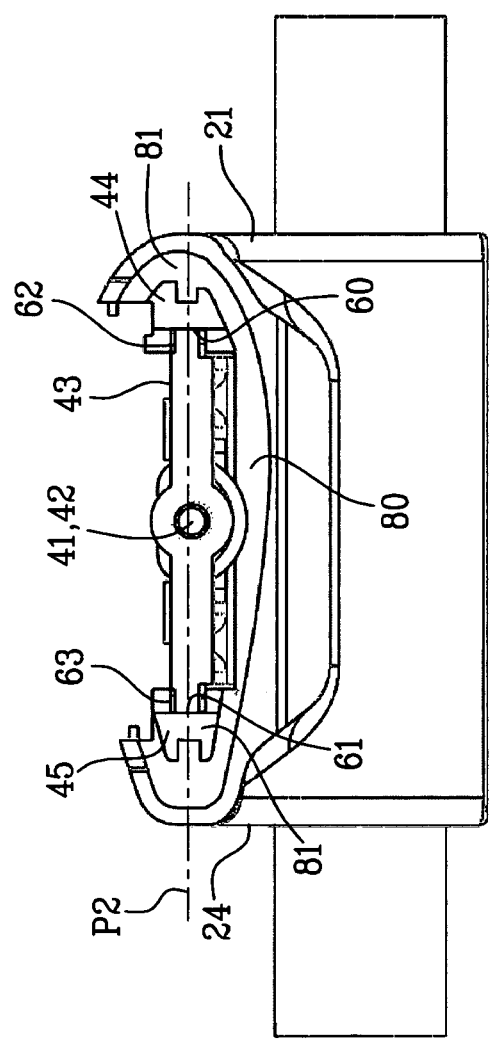
FIG. 9 shows the load carrier foot from FIG. 2 as seen from one side and with a view towards a cavity of the body of the load carrier foot adapted to receive the first end of the load carrying bar.

As seen in FIG. 9, the first and the second slip surfaces 60, 61 are arranged in a first and a second groove 62, 63 in the first and the second deformable locking members 44, 45 respectively. The first and the second groove 62, 63 provides the function of guiding the wedge member 43 during displacement, thus reducing the risk that the wedge member 43 is misaligned, and are in the shown embodiment formed in the first and the second deformable locking members 44, 45 respectively. However instead of grooves, guiding pins, or guiding walls, are possible.

The body 24 of the load carrying foot 21 is adapted to at least partly enclose parts of the load carrying bar 23 after assembly, as can be seen in FIGS. 3, 5, and 7 for example. More specifically, the body 24 of the load carrying foot 21 comprises a cavity 80, more clearly shown in FIG. 9, into which the first end 23a of the load carrying bar 23 can be inserted. In the shown embodiment, the first and the second deformable locking members 44, 45 forms deformable slot portions 81 together with the cavity 80 of the body 24 of the load carrier foot 21, adapted to fix the load carrying bar 23 to the load carrying foot 21. The cavity 80, alone or together with parts of the lock arrangement 40, provides a guiding function, or a guiding arrangement, to the load carrying bar 23. Such guiding function is advantageous when the distance between the first and the second load carrier foot 21, 22 is adjusted.

During assembly, the load carrying bar 23 is inserted into the cavity 80 of the load carrying foot 21 by an end user or in a factory environment during manufacturing of the load carrying roof rack 20. The load carrying roof rack 20 is thereafter positioned across the roof 11 of the vehicle 10 and the support surface 25 of the body 24 of the load carrier foot 21 is positioned to rest at the appropriate surface of the vehicle 10, for example on a rail of the vehicle 10 as shown in FIG. 2 for example.

As further seen in FIGS. 2 and 8, a clamping member 90, in this case a strap element 90a having a first and a second end 91, 92 is used in the shown embodiment to attach the load carrier foot 21 to the vehicle 10. The first end 91 of the strap element 90a is attached to the body 24 of the load carrier foot 21 and the second end 92 is detachably arranged to the sledge 70 of the load carrier foot 21. The load carrier foot 21 is attached to the vehicle 10 by wrapping the strap element 90a around the rail of the vehicle 10 and thereafter attach the second end 92 of the strap element 90a to the sledge 70 of the load carrier foot 21, as shown in FIG. 3. The strap element 90a is flexible in the sense that it permits to be wrapped or folded around another element. It can be resilient or not resilient. It is preferably steel wire reinforced to permit very high loads.

Figure 11A:
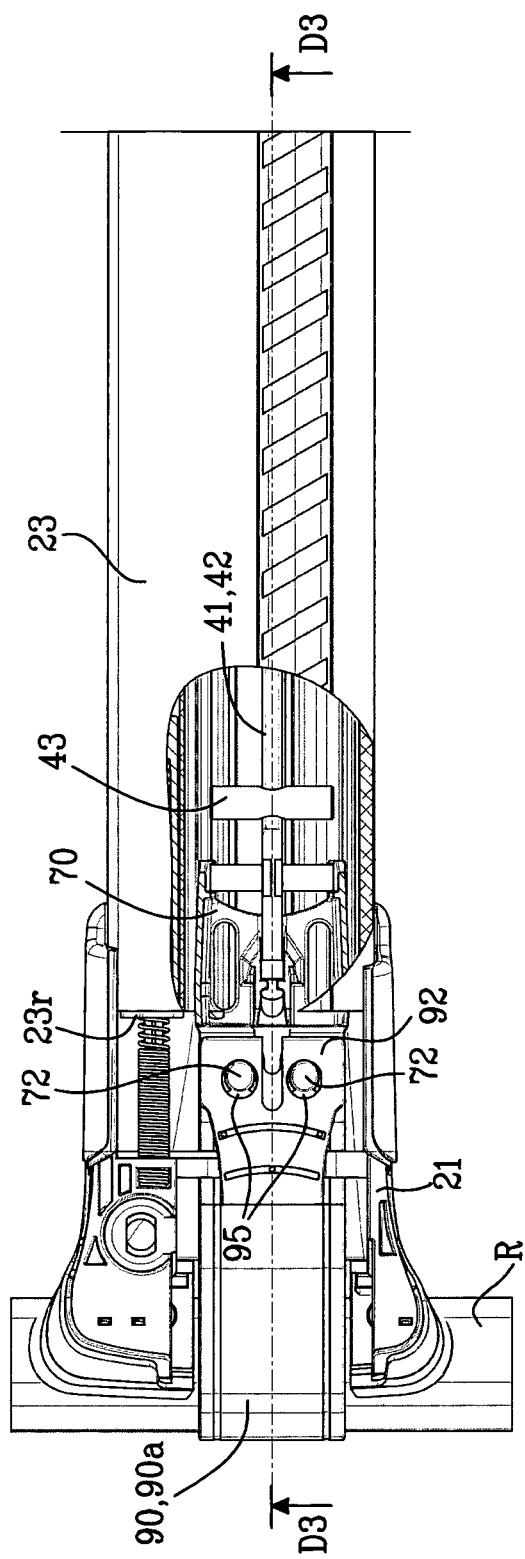
FIG. 11a shows the embodiment of FIG. 10a with a view form above and after being mounted to a rail of a vehicle.

The clamping member 90, in this case the strap element 90a, can be attached to the load carrier foot 21 at a plurality of predefined positions 101, 102, 103, 104. The predefined positions are formed by apertures in the clamping member 90. This permits the clamping member 90 to be primarily adjusted to a suitable length, permitting it to be wrapped around a rail, as shown in FIG. 11a. When the length of the clamping member 90 has been adjusted, the clamping member can be attached to the sledge, which can be tightened to attach the load carrier foot to the vehicle as described herein.

The load carrier foot 21 is mounted to e.g. a rail by resting the support surface 25 of the load carrier foot 21 on the selected surface of the vehicle, e.g. the rail, and the length is adjusted by telescoping the load carrier foot 21, and the second load carrier foot 22, to an appropriate length to fit the selected vehicle. A biasing member 96, in the embodiment shown in FIG. 10a a spring 97, automatically adjusts the load carrying bar to a steady state position substantially between the first and the second load carrier foot 21, 22.

As the tensioning member 41, i.e. the screw 42, is rotated, the sledge 70 is displaced towards the wedge member 43 to tighten the strap element 90a as indicated by the arrow A2 in FIG. 2, at some point the strap element 90a is unable to be further tightened. The sledge 70 is restraining the screw 42 at the swivel connection, and the wedge member 43 has been displaced from the first position, shown in FIG. 2, to a second position, in which the first and the second deformable locking members 44, 45 abuts the front and rear inner surfaces 28, 29 of the load carrying bar 23. During the displacement of the wedge member 43, the first and the second deformable locking members 44, 45 are deformed so that the distance between the second ends 50b, 51b of the first and the second deformable locking members 44, 45 are increased. As the distance between the second ends 50*b*, 51*b* of the first and the second deformable locking members increase, the second ends 50*b*, 51*b* will eventually abut the front and rear inner surfaces 28, 29 of the load carrying bar 23 and thus fix the load carrying bar 23 to the load carrying foot 21.

The first and the second deformable locking members 44, 45 are thus simultaneously deformed when screw 42 is rotated, either to fix the load carrying bar 23 to the body 24 of the load carrying foot 21, or to disengage the first and the second deformable locking members 44, 45 from the inner surface 27 of the load carrying bar 23.

Instead of a strap element 90*a* to secure the load carrying foot 21 to the roof 11 of the vehicle 10, a clamping bracket can be used. Clamping brackets usually cooperates with a support surface of the load carrier foot and imparts a clamping force between parts of the clamping bracket and the support surface to secure the load carrier foot.

As an alternative to a strap element or a clamping bracket, the load carrier foot can be attached to the vehicle 10 using a fix point, e.g. a screw. The tensioning member 41, and the screw 42, can in that case be connected with a swivel connection to the body 24 of the load carrier foot 21.

In an embodiment, the body 24 of the load carrier foot 21 is not provided with a cavity into which the first end 23*a* of the load carrying bar 23 can be inserted. Instead, the first end 23*a* of the load carrying bar 23 can be arranged to rest on a load carrying bar support surface during use. However, the first end 23*a* of the load carrying bar 23 is still enclosing parts of, or all of, the lock arrangement 40.

The second load carrying foot 22 of the load carrying roof rack 20 can be of the same type as the first load carrying foot 21 or optionally be of conventional type. Individual modifications between the first and the second load carrier foot 21, 22 are also possible.

Figure 10A:
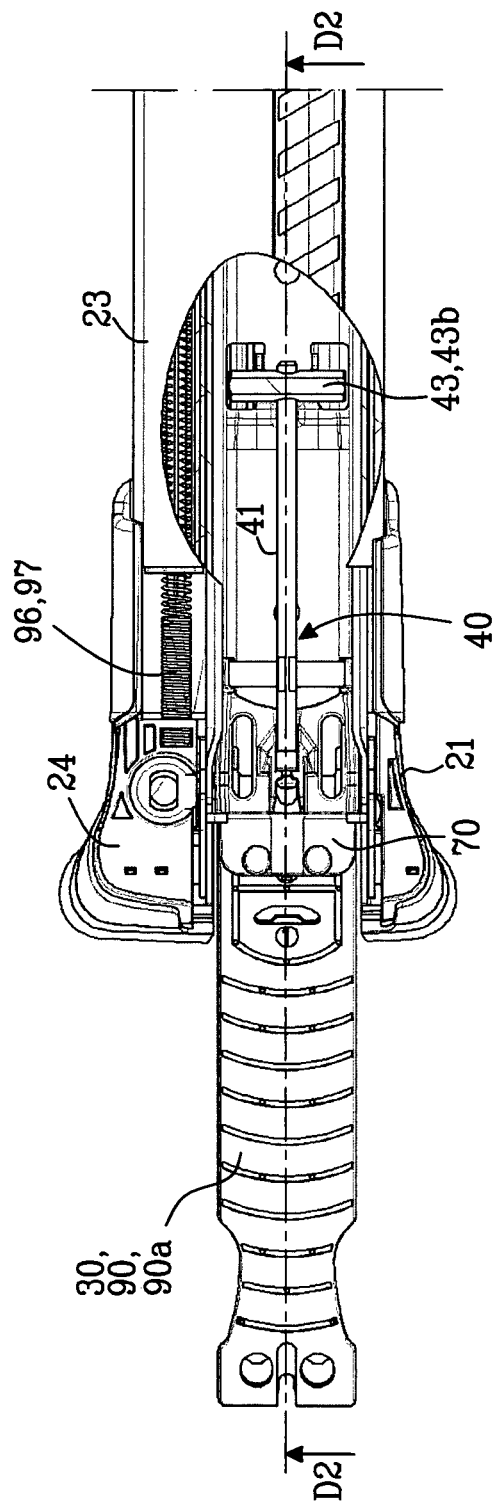
FIG. 10a shows a second embodiment of a load carrier foot with a view form above and before being mounted to a rail of a vehicle.
Figure 10B:
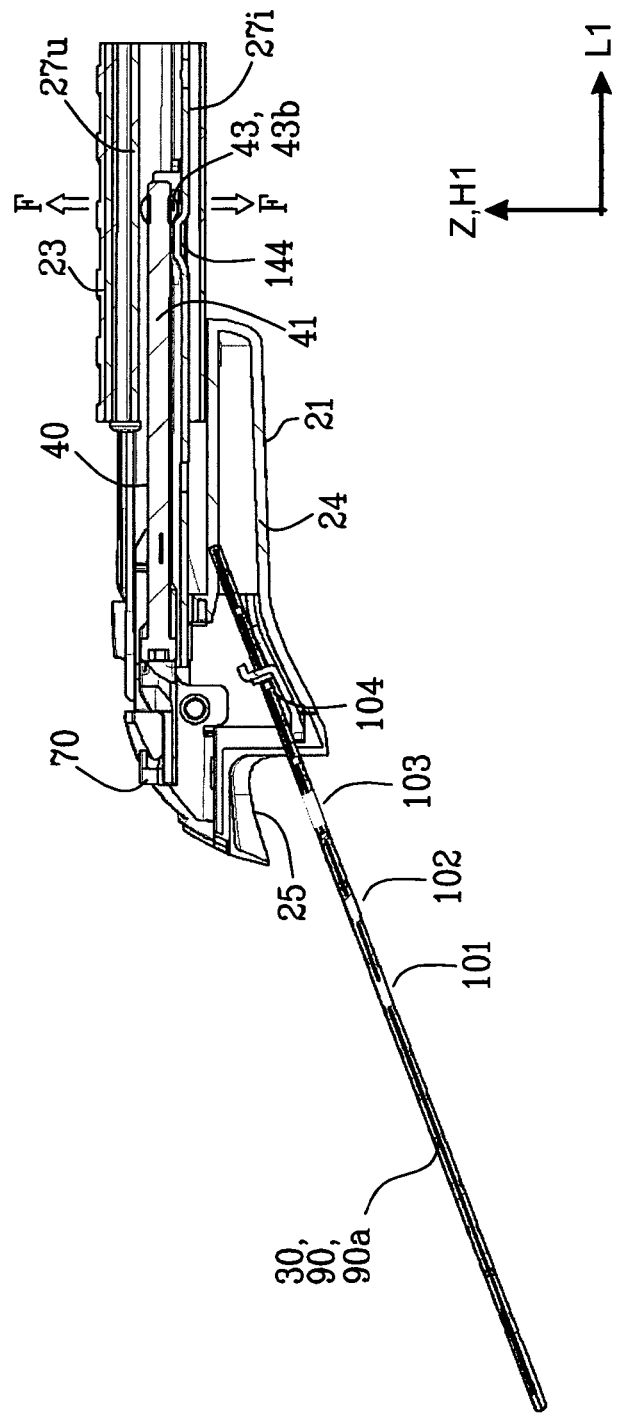
FIG. 10b shows a cross sectional view of the second embodiment of a load carrier foot along the line D2-D2 and before being mounted to a rail of a vehicle.

FIG. 10*a* shows a second embodiment of a load carrier foot 21. The same reference numerals used with respect to FIGS. 1-9 are used for the same features. A part of the load carrying bar is illustrated transparent to show features of the load carrier foot 21 more clearly. FIG. 10*b* is a cross sectional view of FIG. 10*a* along the line D2-D2. With reference to FIGS. 10*a*-10*b*, the load carrier foot 21 comprises a body 24 having a support surface 25 adapted to abut against a first surface of the vehicle 10. The first surface of the vehicle 10 can be a surface of the roof 11 of the vehicle 10 or optionally a surface as shown in FIG. 2, such as a rail, flush rail or similar. The support surface 25 is adapted to cooperate with a retaining arrangement 30, to retain and secure the load carrying foot 21 to the vehicle 10 (shown in FIG. 1). In the shown embodiment, a clamping member 90 in the form of a strap element 90*a* is used to retain the load carrier foot 21 to the vehicle 10.

The load carrier foot 21 enables a load carrying bar 23 to be locked to the load carrier foot 21 at a plurality of different positions using a lock arrangement 40, thus enabling a distance D (indicated in FIG. 1) between the first and the second load carrier foot 21, 22 to be changed, i.e. varied. The lock arrangement 40 can however also be used to lock the load carrying bar 23 at a single position only if desired. The lock arrangement 40 comprises a tensioning member 41 by which the lock arrangement 40 can be operated. In the embodiment shown in FIGS. 10*a*-10*b*, the tensioning member is a rotateable member, in this case a screw 42.

The tensioning member 41 is in working cooperation with a wedge member 43. When the tensioning member 41 is operated, the wedge member 43 is displaced between at least a first and a second position. In cases of a screw 42; when the screw 42 is rotated, the wedge member 43 is displaced between the first and the second positions as will be described in greater detail below. The wedge member is in the shown embodiment formed by a bar 43*b* comprising a threaded aperture through which the tensioning member 41, in this case the screw 42, extends in a cooperative manner. The tensioning member 41, i.e. the screw 42, is positioned so that after assembly with the load carrying bar 23, the screw 42 is arranged in the longitudinal direction of the load carrying bar 23, i.e. along the X axis (shown in FIG. 1) of the load carrying bar 23. This enables the screw 42 upon rotation to displace the wedge member 43 in a direction parallel with the load carrying bar 23 to interact with the load carrying bar 23 in an engaging manner to lock the load carrier foot 21 to the load carrier bar 23.

The tensioning member 41 is in the shown embodiment in FIG. 10 also cooperating with a sledge 70. The sledge 70 is displaceably arranged with respect to the wedge member 43 and the load carrier foot 21. As is noticed, the sledge 70 is arranged to slip on the slip surfaces which extend in the direction of the longitudinal extension L1 of the load carrying bar 23. The sledge 70 and the wedge member 43 are substantially aligned in the same plane. The tensioning member 41 extends between the wedge member 43 and the sledge 70 and is adapted to be in working cooperation with the wedge member 43 and the sledge 70. In the shown embodiment, the tensioning member 41 is in the form of a screw 42 having threads. The screw 42 is threadably engaged with the wedge member 43 while being connected with the sledge 70 with a swivel connection, in this case inserted through an aperture 71 on the sledge 70, providing a swivel connection together with a head of the screw 42. The sledge 70 is further adapted to be connected to the clamping member 90, in this case the strap element 90*a* to attach the load carrier foot 21 to a vehicle, e.g. to the rail of the vehicle.

The wedge member 43 engages, directly or indirectly, the upper and lower inner sides 27*u*, 27*i* of the load carrying bar 23 as is indicated by the arrows in FIG. 10*b* representing force components F imparted by the displacement of the wedge member 43. The force components F are thus imparted in the direction of the Z axis and the height H1 of the load carrying bar 23. As is seen in FIG. 10*b* the load carrier foot 21 comprises a wedge portion 144 adapted to interact with the wedge member 43. The load carrier foot 21 thus form an intermediate member between the wedge member 43 and the inner surface of the load carrying bar. The wedge portion 144 continuously reduces the available height inside of the load carrier bar 23 pinning the wedge member 43 as the tensioning member 41 displaces the wedge member 43 in a direction towards the sledge 70.

As the tensioning member 41 rotates, the sledge 70 is displaced in a direction towards the second load carrier foot 22 (seen in FIG. 1) along the length L1 of the load carrying bar 23. The clamping member 90, in this case the strap element 90*a*, is thus tightened and provides a firm grip about the rail.

Figure 11B:
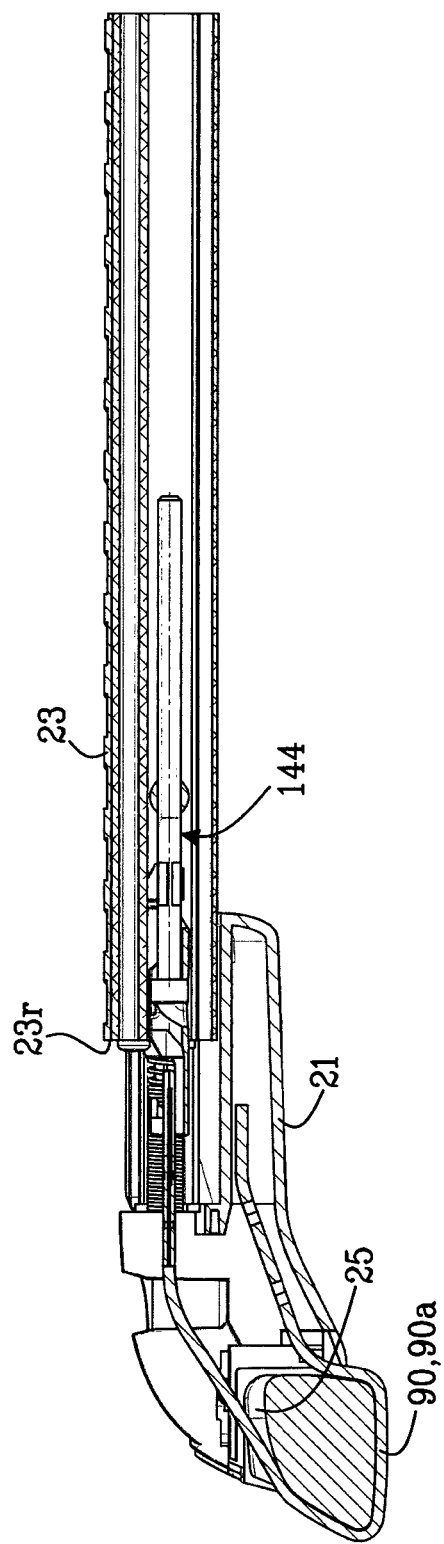
FIG. 11b shows a cross sectional view of the embodiment of FIG. 10a along line D3-D3 after being mounted to a rail of a vehicle.
Figure 11C:
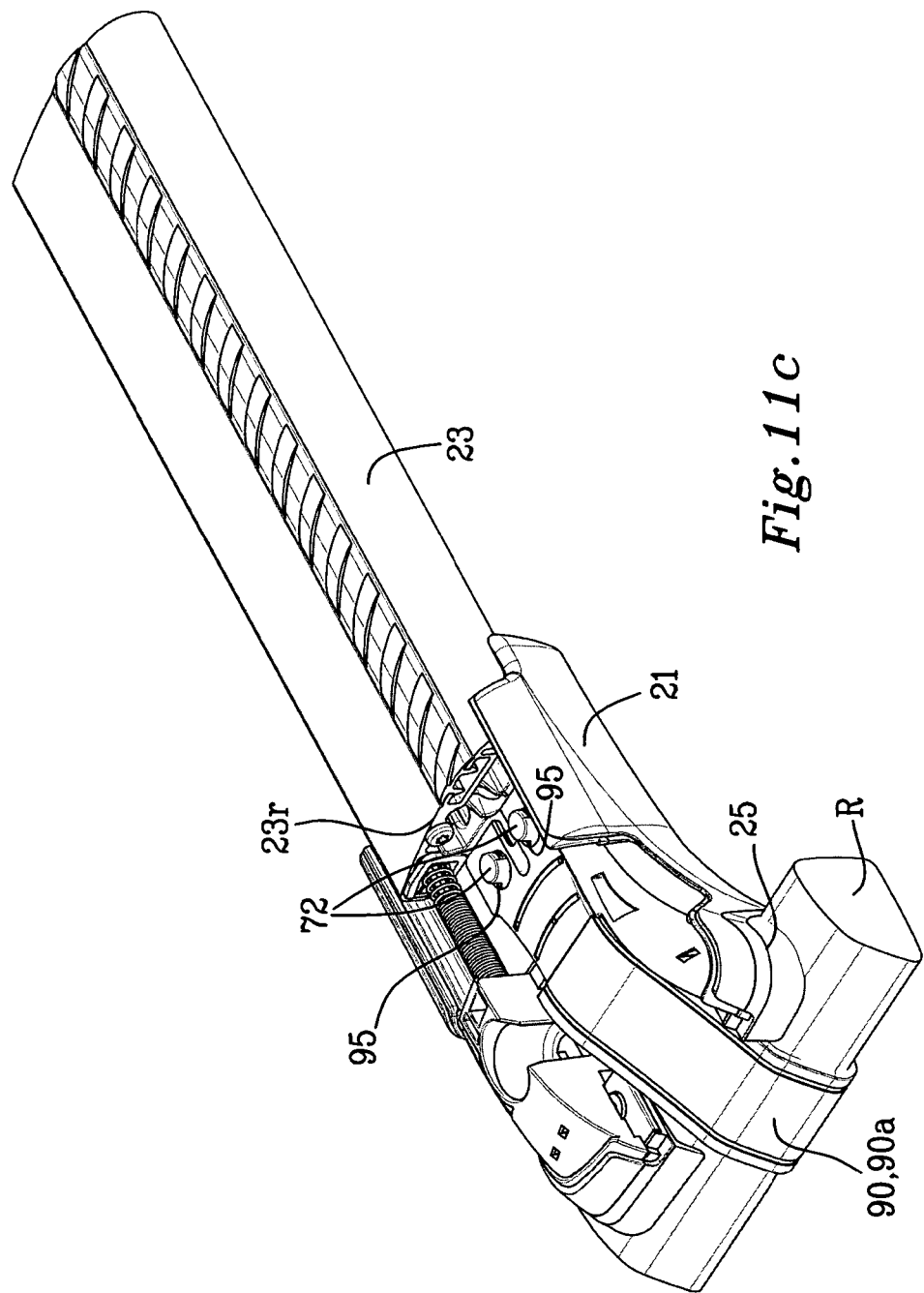
FIG. 11c shows the embodiment of FIG. 10a with a view in perspective and after being mounted to a rail of a vehicle.

FIGS. 11*a*-11*c* show the load carrier foot 21 of FIG. 10*a* after the tensioning member 41 has been tightened. The wedge member 43 is now in a retaining position, i.e. a position in which the wedge member 43 retain, i.e. fix, the load carrying bar 23 to the load carrying foot 21. The load carrying bar is thus locked from displacement, i.e. in a locked position. The load carrying bar 23 is partly transparent to better show features of the load carrier foot 21. FIG. 11*b* shows a cross sectional view of FIG. 11*a* along the line D3-D3. FIG. 11c is a view of the load carrier foot 21 in perspective. As is noted, the load carrier foot 21 is illustrated without a cover, or housing, to better visualise the interior of the load carrier foot 21. FIG. 11a further shows that the distance between the wedge member 43 and the sledge 70 has been reduced as compared with FIG. 10a. The sledge 70 has been displaced to tighten the clamping member 90, in this case the strap element 90a which is wrapped about a rail R of a vehicle. The clamping member 90, in this case the strap element 90a, is releasably connected to the sledge 70 via two apertures 95 in the clamp member 90 which are hooked to the sledge 70 by means of hook like protrusions 72.

Turning again to FIG. 10b, the clamping member 90, in this case the strap element 90a, can be attached to the load carrier foot 21 at a plurality of predefined positions 101, 102, 103, 104. The predefined positions are formed by apertures in the clamping member 90. This permits the clamping member 90 to be primarily adjusted to a suitable length, permitting it to be wrapped around a rail, as shown in FIG. 11a. When the length of the clamping member 90 has been adjusted, the clamping member can be attached to the sledge, which can be tightened to attach the load carrier foot to the vehicle as described herein.

As is noted, the wedge member 43 is substantially at the same position as in FIG. 10a with respect to the end 23r of the load carrying bar 23. The wedge member 43 is displaced just a short distance, just enough to wedge it towards the upper side 27i of the interior of the load carrying bar 23. It should be noted that the cross section of the load carrying bar 23 could be partitioned by one or more inner walls, e.g. to provide for rigidity to the load carrying bar 23. In such cases, it is possible that the wedge member 43 abuts a partition wall of the load carrying bar 23, which is also considered to be an inner wall of the load carrying bar 23, the important thing is that the force components which are imparted by the wedge member 43 is in this embodiment directed along the height Hl direction of the load carrying bar 23.

The invention claimed is:

1. A load carrier foot for a load carrying roof rack for a vehicle, said load carrier foot being adapted to be connected with a load carrying bar having a longitudinal extension, a height, and a width, said load carrier foot comprising:
   a support surface adapted to rest against a first surface of said vehicle,
   a lock arrangement adapted to lock said load carrying bar to said load carrier foot, said lock arrangement comprising a tensioning member adapted to displace a wedge member at least along said longitudinal extension of said load carrying bar to a retaining position in which said wedge member retains said load carrying bar to said load carrying foot in a locked position, and
   a retaining arrangement adapted to retain said load carrier foot to said vehicle,
   wherein said tensioning member of said lock arrangement is adapted to operate said retaining arrangement, and
   wherein said retaining arrangement comprises a retaining strap coupled to said lock arrangement and said body of said load carrier foot, wherein said tensioning member of said lock arrangement is adapted to secure said retaining strap to said vehicle.

2. The load carrier foot according to claim 1, wherein upon displacement of said wedge member, said wedge member abuts at least one inner surface of said load carrying bar, to retain said load carrying bar to said load carrying foot in a locked position.

3. The load carrier foot according to claim 1, wherein upon displacement of said wedge member, said wedge member abuts an intermediate member, such as a portion of said load carrier foot, to wedge said intermediate member towards at least one inner surface of said load carrying bar, to thereby retain said load carrying bar to said load carrying foot in a locked position.

4. The load carrier foot according to claim 3, wherein said intermediate member of said load carrier foot is formed by a displaceable locking member, said displaceable locking member comprises a first portion and a second portion, said first portion being adapted to be displaced a greater distance than said second portion, and in that said wedge member is adapted to be displaced in a direction from said first portion to said second portion of said displaceable locking member during said displacement towards said retaining position.

5. The load carrier foot according to claim 1, wherein said wedge member, when being in said retaining position, imparts a force component along said height of said load carrying bar and/or along said width of said load carrying bar so that said wedge member retains said load carrying bar to said load carrying foot in a locked position.

6. The load carrier foot according to claim 1, wherein said retaining arrangement comprises a clamping member, said clamping member being adapted to impart a clamping force between said first surface of said vehicle and said clamping member upon operating said tensioning member, to thereby retain said load carrier foot to said vehicle.

7. The load carrier foot according to claim 6, wherein said clamping member is operable via a sledge, said wedge member being in working cooperation with said sledge via said tensioning member so that upon operation of said tensioning member, said sledge and said wedge member are displaced with respect to each other.

8. The load carrier foot according to claim 7, wherein at least a part of said clamping member is adapted to be detachably connectable to said sledge.

9. The load carrier foot according to claim 7, wherein said sledge is slideably arranged with respect to said body of said load carrier foot.

10. The load carrier foot according to the claim 7, wherein said sledge slides in a portion of said load carrier foot having substantially a C-shaped cross section.

11. The load carrier foot according to claim 7, wherein said sledge is adapted to be displaced along said longitudinal extension of said load carrying bar.

12. The load carrier foot according to claim 7, wherein said clamping member is attached to said load carrier foot at a first position, and to said sledge.

13. The load carrier foot according to claim 12, wherein said clamping member is releaseably attached to said body of said load carrier foot at said first position and/or to said sledge.

14. The load carrier foot according to claim 1, wherein said tensioning member is a rotateable tensioning member, such as a screw.

15. The load carrier foot according to claim 14, wherein said wedge member is threadably engaged with said tensioning member, enabling displacement of said wedge member upon rotation of said tensioning member along said longitudinal extension of said load carrying bar.

16. The load carrier foot according to claim 14, wherein said retaining arrangement is operable via a sledge, and wherein said rotatable tensioning member is connected to said sledge via a swivel connection.

17. The load carrier foot according to claim 4, wherein said load carrier foot comprises a body having a cavity, said cavity being adapted to receive at least a part of said load carrying bar, said cavity of said body cooperates with said displaceable locking member to retain said load carrying bar to said load carrying foot in a locked position.

18. The load carrier foot according to claim 1, wherein said load carrier foot comprises a body having a cavity, said cavity being adapted to receive at least a part of said load carrying bar.

19. A load carrying roof rack for a vehicle, comprising:
   a load carrying bar; and
   a load carrier foot, comprising:
      a support surface adapted to rest against a first surface of the vehicle,
      a body having a cavity, the cavity being adapted to receive an end of the load carrying bar within an interior of the cavity;
      a lock arrangement adapted to lock the load carrying bar to the load carrier foot, the lock arrangement comprising:
         a tensioning member, and
         a wedge member,
         wherein the tensioning member is adapted to displace the wedge member in a longitudinal direction within the load carrying bar to lock the load carrying bar to the load carrying foot and
      a retaining strap coupled to the lock arrangement and the body of the load carrier foot, wherein the tensioning member of the lock arrangement is adapted to secure the retaining strap to the vehicle.

20. The load carrying roof rack according to claim 19, wherein the load carrying bar comprises an upper inner surface and a lower inner surface, and wherein displacement of the wedge member is adapted to impart a force component towards the upper inner surface and the lower inner surface of the load carrying bar.

21. The load carrying roof rack according to claim 19, wherein the lock arrangement further comprises a sledge member, wherein the tensioning member is adapted to displace the sledge member in the longitudinal direction of the load carrying bar toward the wedge member at the same time the wedge member is displaced in the longitudinal direction of the load carrying bar toward the sledge member.

* * * * *